ous010691879B2

(12) United States Patent
Wu et al.

(10) Patent No.: US 10,691,879 B2
(45) Date of Patent: Jun. 23, 2020

(54) SMART MULTIMEDIA PROCESSING

(71) Applicant: EMC Corporation, Hopkinton, MA (US)

(72) Inventors: Sandro Jiawei Wu, Shanghai (CN); Chao Chen, Shanghai (CN); Patrick Minggang Lu, Shanghai (CN); Scott Shuo Xu, Shanghai (CN); Jingjing Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 39 days.

(21) Appl. No.: 14/973,412

(22) Filed: Dec. 17, 2015

(65) Prior Publication Data

US 2016/0196252 A1 Jul. 7, 2016

(30) Foreign Application Priority Data

Jan. 4, 2015 (CN) .......................... 2015 1 0004939

(51) Int. Cl.
*G06F 17/00* (2019.01)
*G06F 40/169* (2020.01)
*G06F 16/43* (2019.01)
*G10L 15/26* (2006.01)

(52) U.S. Cl.
CPC ............ *G06F 40/169* (2020.01); *G06F 16/43* (2019.01); *G10L 15/26* (2013.01)

(58) Field of Classification Search
CPC ............ G06F 17/241; G06F 17/30023; G06F 17/3005; G06F 17/3082; G06F 16/43; G06F 40/169; G10L 15/26

USPC ......................................................... 715/231
See application file for complete search history.

(56) References Cited

U.S. PATENT DOCUMENTS

| 7,860,836 | B1 | 12/2010 | Natanzon et al. |
| 8,775,356 | B1 | 7/2014 | Chen et al. |
| 9,038,175 | B1 | 5/2015 | Yakoel et al. |
| 9,189,408 | B1 | 11/2015 | Douglis et al. |
| 9,424,003 | B1 | 8/2016 | Neumann |
| 9,817,832 | B1 | 11/2017 | Protopopov et al. |
| 2001/0023436 | A1* | 9/2001 | Srinivasan ........... G11B 27/031 709/219 |
| 2001/0051958 | A1* | 12/2001 | deVries ............. G06F 17/30817 715/233 |
| 2002/0069218 | A1* | 6/2002 | Sull .................... G06F 17/30796 715/202 |
| 2005/0081159 | A1* | 4/2005 | Gupta ..................... G06F 17/22 715/751 |

(Continued)

FOREIGN PATENT DOCUMENTS

| CN | 101646050 | 2/2010 |
| CN | 103345465 | 10/2013 |
| WO | 2014186052 | 11/2014 |

*Primary Examiner* — Jason T Edwards
(74) *Attorney, Agent, or Firm* — BainwoodHuang

(57) ABSTRACT

Embodiments of the present disclosure intend to provide a method and system for processing multimedia data. According to one aspect of the present disclosure, there is provided a method for processing multimedia data, comprising: generating an annotation text; and associating the annotation text with a corresponding partition in the multimedia data. By using the processing method and system according to the embodiments of the present disclosure, for example, multimedia data searching efficiency may be effectively enhanced.

25 Claims, 3 Drawing Sheets

(56) References Cited

U.S. PATENT DOCUMENTS

| | | | |
|---|---|---|---|
| 2007/0118873 A1* | 5/2007 | Houh | H04N 21/435 |
| | | | 725/136 |
| 2008/0250080 A1* | 10/2008 | Arrasvuori | G06F 17/30029 |
| 2008/0313541 A1* | 12/2008 | Shafton | G06F 17/30817 |
| | | | 715/725 |
| 2009/0210779 A1* | 8/2009 | Badoiu | G06F 17/3082 |
| | | | 715/230 |
| 2009/0327856 A1* | 12/2009 | Mouilleseaux | G06F 17/30781 |
| | | | 715/230 |
| 2010/0235379 A1* | 9/2010 | Reichbach | G06F 17/30017 |
| | | | 707/769 |
| 2012/0102387 A1* | 4/2012 | Badoiu | G06F 17/3082 |
| | | | 715/230 |
| 2013/0031457 A1* | 1/2013 | Griffiths | G06F 17/241 |
| | | | 715/231 |
| 2013/0144414 A1* | 6/2013 | Kajarekar | G10L 17/02 |
| | | | 700/94 |
| 2014/0215512 A1* | 7/2014 | Maruyama | G06K 9/00671 |
| | | | 725/34 |
| 2015/0161214 A1* | 6/2015 | Kali | G06F 16/24568 |
| | | | 707/758 |
| 2015/0244943 A1* | 8/2015 | Brown | G06F 17/30265 |
| | | | 348/571 |
| 2016/0063087 A1* | 3/2016 | Berson | G06Q 30/0259 |
| | | | 707/740 |
| 2017/0164056 A1* | 6/2017 | Sirot | H04N 21/41407 |

\* cited by examiner

SMART MULTIMEDIA PROCESSING

RELATED APPLICATIONS

This application claims priority from Chinese Patent Application Number CN201510004939.X filed on Jan. 4, 2015 entitled "METHOD AND SYSTEM FOR SMART MULTIMEDIA PROCESSING" the content and teachings of which is herein incorporated by reference in its entirety.

FIELD OF THE INVENTION

Embodiments of the present disclosure relate to data processing.

BACKGROUND OF THE INVENTION

In recent years, with technological advancement of information technologies, more and more multimedia data are generated. For example, more and more people use smart phones, cameras, voice recorders or video cameras to record things appearing in daily work and life, which causes exponential increase of generated data amount. However, for the generated data, particularly multimedia data, there lacks an efficient search method for searching them so as to quickly find contents of interest, e.g., a segment of video or audio. A general searching method is searching as per shooting time or file name, and sometimes, all video or audio contents have to be traversed to find a specific video or audio segment. It is acceptable for life events that are not demanding on time.

However, for some specific work applications, it is always inefficient. For example, when a device of a client fails, a field technical engineer will always shoot or record the field observations, which will generate a large data amount. Without an efficient searching method, a rear-area engineer has to browse all multimedia data materials, which is always unacceptable for a scenario where the field needs to solve the technical problem as quickly as possible.

Therefore, a smart multimedia data processing system is needed, which can perform fast location or efficient search for the multimedia data.

SUMMARY OF THE INVENTION

Embodiments of the present disclosure intend to disclose a method and system for processing multimedia data.

According to one aspect of the present disclosure, there is provided a method for processing multimedia data, comprising: generating an annotation text; and associating the annotation text with a corresponding partition in the multimedia data.

According to another aspect of the present disclosure, there is provided a system for processing multimedia data, comprising: a text generating module configured to generate an annotation text; and an associating module configured to associate the annotation text with a corresponding partition in the multimedia data.

According to a further aspect of the present disclosure, there is provided a computer program product stored on a non-transient computer-readable memory medium for processing multimedia data, comprising: a first program instruction for generating an annotation text, and a second program instruction for associating the annotation text with a corresponding partition in the multimedia data.

Through using some embodiments of the present disclosure, corresponding beneficial effects may be achieved, e.g., enhancing multimedia data searching and locating efficiency.

BRIEF DESCRIPTION OF THE ACCOMPANYING DRAWINGS

The present disclosure may be better understood with reference to the following drawings and description. The components in the drawings are not necessarily proportional; on the contrary, the focus is laid on illustration of the principle of the present disclosure. Besides, in the drawings, same reference numerals represent corresponding portions. In the accompanying drawings.

DETAILED DESCRIPTION OF THE PREFERRED EMBODIMENTS

In the description below, some specific details will be elaborated to provide thorough understanding of various aspects of the subject matter of the present disclosure. However, the subject matter of the present disclosure may also be implemented without these specific details. In some embodiments, known structures and methods associated with the smart multimedia processing method and system will not be described in detail for now so as to avoid confusion of the description of other aspects of the present disclosure.

Unless otherwise indicated, the wording "comprise" will be interpreted as an open inclusion throughout the whole text of the description and the appended claims, i.e., interpreted as "including, but not limited to."

Recitation of "one embodiment" or "an embodiment" throughout the whole text of the present description means a specific feature, structure or characteristic described in conjunction with the embodiment is included within at least one embodiment. Therefore, the expression "in one embodiment" or "in an embodiment" appearing in various places throughout the present disclosure does not necessarily refer to a same aspect. Additionally, specific features, structures or characteristics may be combined in any appropriate manner in one or more aspects of the present disclosure.

Figure 1:
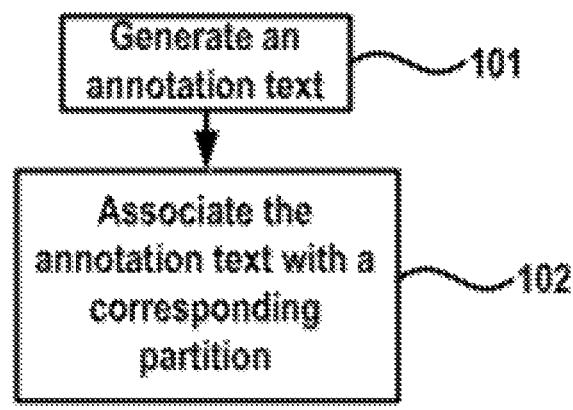
FIG. 1 shows a flow diagram of a method for processing multimedia data according to one embodiment of the present disclosure.

Now refer to FIG. 1. FIG. 1 shows an embodiment of a method for processing multimedia data according to the present disclosure. In the embodiment as shown in FIG. 1, in 101, an annotation text is generated; and in 102, the annotation text is associated with a corresponding partition of the multimedia data. Those skilled in the art may understand that the multimedia data comprise at least one partition.

Figure 2:
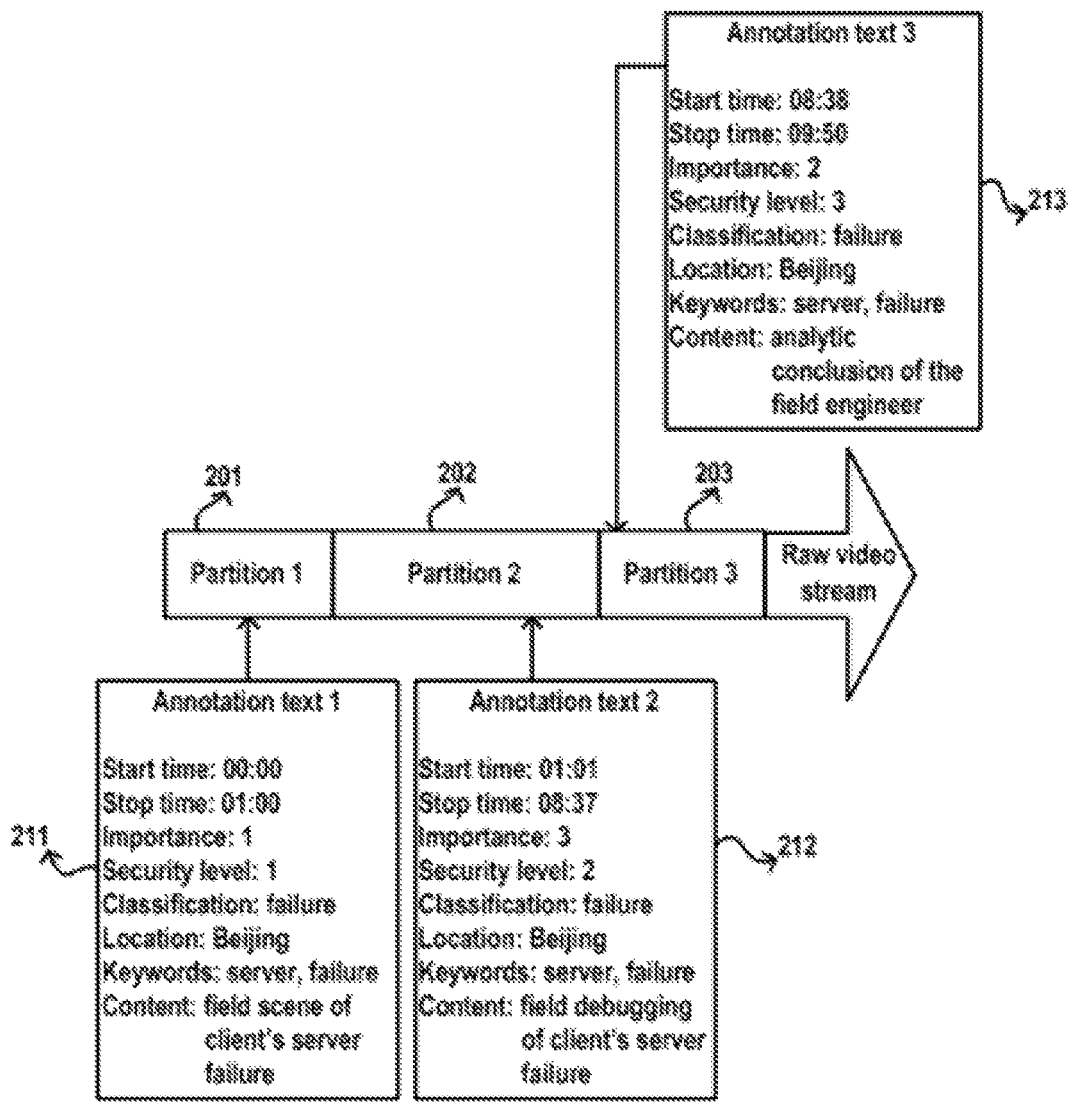
FIG. 2 shows a schematic diagram of a video partition and an annotation text according to one embodiment of the present disclosure.

FIG. 2 shows a schematic diagram of a video partition and an annotation text according to one embodiment of the present disclosure. Now, one example of the present disclosure will be described with reference to FIGS. 1 and 2.

In an embodiment of the present disclosure, multimedia data may be one of video data, audio data, image data, and text data. For example, the video data are video data that may be encoded with various coding formats such as MP4, AVI, MKV, RM, RMVB, WMV, M4V, VIDX, XVID, ASF, etc. The audio data may be audio data such as AAC, MP3, WMA, AMR, FLAC, APE, and the like. The image data may be image data such as RAW, BMP, PCX, TIFF, GIF, JPEG, PNG, and the like. The text data may be text data such as Microsoft Office® series, txt text data and the like.

The annotation text may include various kinds of information, wherein various kinds of information items are manually added by a person or automatically added through technical means.

For example, when the multimedia data are video or audio data, the annotation text may comprise information indicating the start time and stop time of a video or audio. Besides, when the video or audio data are composed of multiple video or audio data partitions, the annotation text may comprise information indicating the start time and stop time of a corresponding partition. For example, with reference to FIG. 2, the original video stream in FIG. 2 includes multiple partitions 201, 202, and 203. The original video stream, for example, is a video shot by a field technical support engineer. The shooting can be discontinuous in time. Video shot continuously each time may form a partition, while a plurality of continuously shot videos are combined to form the original video stream. In a further example, different videos or audios may be combined to form an original multimedia stream, e.g., partition 201 may be a first partition of video stream, partition 202 may be a second partition of audio stream, while partition 203 may be a third partition of video stream, wherein the first partition 201 is a filed video of for example a client server failure device as shot by the field support engineer, the second partition 202 is a failure analysis audio from a rear-end technical engineer, while the third partition 203 is a video of a technical supervisor guiding how to process. Those skilled in the art would appreciate that other partition combination manners are also feasible, e.g., an image and an audio form a single partition, wherein when the image is played, the audio is also played. In another example, text and audio data form a single partition, such that when the text data are played, the audio is also played. In a further example, an audio forms a single partition, such that when audio data are played, default image data may be displayed, e.g., a pure black background image.

In the example as shown in FIG. 2, the first annotation text 211 and the first partition 201 are associated. In the first annotation text 211, there is recorded a start time 00:00 and a stop time 01:00 of the first partition 201. As mentioned above, the first partition 201 is a field video of for example a client server failure device shot by a field support engineer, the video lasting 1 minute. Those skilled in the art would appreciate that the video duration is not limited here; there may be other durations and may have corresponding start time and stop time. Those skilled in the art would appreciate that the start time and stop time of the video or audio stream may be manually added or automatically added.

Those skilled in the art would appreciate that in the case of multimedia only including non-stream media such as image and text data, the annotation text might be an information item without a start time and an end time.

Besides, the annotation text may also comprise an information item about importance. For example, in the example of FIG. 2, the video importance of the first partition 201 is 1, the video importance of the second partition 202 is 3, and the video importance of the third partition 203 is 2. It would be appreciated that for multimedia data that become increasingly massive, it is essential to grade the multimedia data by importance, such that when browsing multimedia, the multimedia data may be screened according importance levels. For example, as far as the circumstance of the above client server failure is concerned, when there is no field engineer, the client autonomously shoot a field video; he/she might shoot multiple segments of videos (multiple video partitions), most of which is insignificant to solution of the problem. The rear-end technical support engineer may grade the videos shot by the client by importance levels, such that in the case of need, the technical supervisor may only browse multimedia data of a specific importance level. Those skilled in the art would appreciate that it is only an example to classifying importance by numbers, and there may be other taxonomy methods, e.g., classifying by "unimportant," "important," "very important." Those skilled in the art would appreciate that the information item regarding importance may be manually added or automatically added.

The annotation text may also include an information item regarding security level. For example, in the example of FIG. 2, the video security level of the first partition 201 is 1, the video security level of the second partition 202 is 2, and the video security level of the third partition 203 is 3. For some cases (e.g., product research and development), corresponding multimedia data (e.g., specific details about product research and development) usually belong to commercial secrets of a company or institution, access to which is always restricted. Different technical departments may only have corresponding security levels and authorities so as to prevent leakage of commercial secrets. In the example of FIG. 2, the security level of the first video partition 201 describing the server failure field as shot by a field engineer is 1, which means all personnel within the company may access it. The security level of the second video partition 202 regarding field debugging of the client server failure by the field technician is 2, which may mean that only personnel having an security authority of 2 or above (e.g., rear-end technical engineer and technical supervisor) can access it. The security level of the third video partition 203 regarding corresponding analytical conclusion of the field engineer is 3, which means only personnel with a security authority of 3 or above (e.g., technical supervisor) can access it. Because the security level of the rear-end technical engineer is only 2, it means the rear-end technical engineer cannot access the third video partition 203. Those skilled in the art would appreciate that classifying security levels by numbers is only an example, and there may be other taxonomy methods, e.g., classifying by "open," "confidential," "top confidential," etc. Those skilled in the art would appreciate that the information item regarding security level may be manually added or automatically added. Alternatively, the security level is an information item first checked, i.e., first checking whether the security level of the user meets the security level requirement of the multimedia data. For example, when searching annotation texts, only those annotation texts satisfying the security level among the annotation texts are searched, or when displaying corresponding partitions of the multimedia data based on a search result, only those partitions satisfying the security level among the multimedia data are displayed.

Besides, the annotation text may also comprise an information item regarding multimedia data classification. For example, in the example of FIG. 2, all of the first annotation text 211, the second annotation text 212, and the third annotation text 213 include a classification item, which is "failure." For example, in the scenario mentioned above, there may be a variety of videos regarding the client server field, e.g., videos regarding installation, debugging, running, monitoring, and failure and the like. The rear-end engineer and the technical supervisor may screen by classifications. For example, when the client server fails, multimedia data of a failure classification may be invoked, including current multimedia data and historical multimedia data regarding the server failure. The current multimedia data and historical multimedia data may be combined to form a new multimedia data stream for the rear-end engineer and technical supervisor to browse. Those skilled in the art would appreciate that similar processing may be performed in other circumstances, e.g., combining multimedia data of an "interview" classification for personnel from a consulting company to comprehensively understand the client's needs. Those skilled in the art would appreciate that classifying by words is only exemplary, and there may be other taxonomy methods, e.g., classifying by numbers, time or letters. Those skilled in the art would appreciate that the information item regarding taxonomy may be manually added or automatically added.

The annotation text may also comprise an information item regarding geological location of multimedia data. The geological location of multimedia data may be for example a geological location where the multimedia data are generated, for example, the multimedia video is shot in Beijing, Shanghai or Guangzhou. In another example, the geological location of the multimedia data may be a location where the multimedia data are processed, e.g., although the video material is shot in Beijing, the post processing is done in Shanghai; therefore, the geological location information of the video is recorded to be Shanghai. For example, in the example of FIG. 2, all of the first annotation text 211, the second annotation text 212, and the third annotation text 213 include the geological location information item "Beijing," because the client company is in Beijing, the field of its server is also in Beijing; therefore, the location information in the annotation text associated with the three videos as shot is also labeled to Beijing. Those skilled in the art would appreciate that classifying by city is also exemplary; and there may be other taxonomy methods, e.g., classifying by altitude-latitude coordinates. Those skilled in the art would appreciate that an information item about classification may be manually added or automatically added, for example, recorded in real-time through a GPS device.

Besides, the annotation text may comprise an information item regarding keywords. In order to facilitate searching a content of particular interest, a corresponding label is always added to a corresponding multimedia. The label is just a kind of keywords. For example, as far as a video website is considered, a corresponding keyword label is always added to the multimedia data, for the user to search. For example, a bite of China is always added with labels such as documentary, cuisine, culture and the like on video websites. In the example of FIG. 2, all of the annotation texts 201, 202 and 203 include corresponding keyword items: server, failure. Those skilled in the art would appreciate that the information regarding keyword may be manually added or automatically added. For example, as far as a text multimedia such as paper, a keyword may be automatically added by calculating words appearing in high frequency. In another example, an optical character recognition technology (OCR) may be used to recognize characters appearing in each video frame in the multimedia of a video so as to automatically add a keyword. In a further example, a voice recognition technology may be used to recognize high-frequent words appearing in the audio stream so as to automatically add a keyword. Those skilled in the art would appreciate that the above automatic add technology by performing optical character recognition to a video frame or an image or by performing voice recognition to an audio may also be applied to automatic adding of other information item in an annotation text.

Besides, the annotation text may also include an information item regarding content description. The content description is for describing contents of multimedia data and relevant comments or opinions. For example, in the example of FIG. 2, the content description item in the first annotation text 201 records "client's server failure field," which corresponds to the content of the video partition 201; the content description item in the second annotation text 202 records "client's server failure field debugging," which corresponds to the content of the video partition 202; the content description item in the third annotation text 203 records "field engineer's analysis conclusion," which corresponds to the content of the video partition 203. Besides the above description, content description of the annotation text may also record other content, e.g., chatter content of the field engineer in the field. In other words, contents such as chatter/comments/opinions regarding a multimedia data partition may also be recorded in the annotation text as a content description item. Those skilled in the art would appreciate that the information item regarding content description may be manually added or automatically added.

The annotation text may also comprise an information item regarding role property. For example, for a video such as a movie or television, the movie or television will occasionally have contents inappropriate for kids to watch. By adding corresponding role attribute information (e.g., role attributes such as parents or kids), viewers of the multimedia data may be subject to corresponding classified authorized browsing. Those skilled in the art would appreciate that the information item regarding role attributes may be manually added or automatically added. Those skilled in the art would also appreciate that performing role attribute assignment by parents and children is only exemplary, and there may also be other role attribute classifications, e.g., classifications by viewer role attributes such as G-level, PG-level, PG-13 level, R-level, NC-17 level adopted by Motion Picture Association of America (MPGG).

In addition, the annotation text may also comprise an information item regarding hot degree (also known as popularity degree) graph. For an increasing popular social network, network subscribers will exhibit a strong interest in some contents in mass multimedia data, which may be represented by "hot degree." By digging and analyzing hotter multimedia data in a social network, useful information such as popular trend and user behavior modes may be obtained, such that this useful information may be utilized for business development or deploying a handling strategy. In one example, hot degree analysis may be performed to video data in a video stream so as to obtain a hot degree graph for the video data. For example, the video data comprises a plurality of video partitions, and by calculating hot degrees of corresponding video partitions based on importance, play times, number of comments and other relevant information of the video partition and representing hot degrees of video partitions with different colors, a hot degree graph for the multimedia data may be generated. For example, when a movie or TV series is played in the Internet, people always fast forward to skip the prelude of the movie or TV series; therefore, the video partition at the prelude portion of the movie or TV series may be represented by white color, which means the hot degree of the video partition of the prelude portion is relatively low. For another example, when a key part of a movie and a TV series is played, people will always watch the video partition of the part in the whole course, or even replay the video partition of that portion, which results in that the play times is relatively high (a higher popularity degree) and it will not be skipped. This signifies that the hot degree of the video partition of the key portion is relatively high. By using a hot degree graph of multimedia data, a plurality of advantageous effects may be obtained, for example, a multimedia partition with a higher hot degree may be cached in priority, thereby obtaining a better and more efficient browsing efficiency. Those skilled in the art would appreciate that the information item regarding hot degree graph may be manually added or automatically added.

Besides, the annotation text may also comprise an information item indicating main colors of a video or image. The main colors refer to several colors having a higher percentage in the video frame or image, e.g., one or three colors with a higher percentage. The color classification may use a conventional 16-color or 256-color system to perform classification. For example, in a sea image, blue occupies 90%, white occupies 6%, and yellow occupies 3%. In this case, the main colors include blue, white and yellow (ordered by percentage). When an image regarding sea is searched, an image with blue occupying the largest percentage may be searched.

In another example, the annotation text may comprise information indicating at least one of displaying location and displaying format during play. At least one of the above keyword, content description, importance level, classification information, role attribute, hot degree graph, security level, and geographical location may be loaded into the multimedia data when playing the multimedia data so as to be displayed simultaneously. For example, when the multimedia data is video or audio data, a plurality of information items in the annotation text may be selectively loaded into the video or image data as required so as to be displayed simultaneously. Therefore, the annotation text may comprise information indicating at least one of the displaying location where the above information items appear in the video or image and the displaying format. For example, information about the security level in the annotation text may be displayed on the upper left corner of the video or image, and the security level information may be displayed in red font. When the multimedia data is video data, the annotation text may also have information prescribing the start time and stop time of displaying the above information items. Those skilled in the art would appreciate that the information item regarding at least one of the displaying location and displaying format may be manually added or automatically added.

In one example, the annotation text may also comprise an information item regarding a key area. For example, when the multimedia data is an ultrasonic imaging graph, the image may have an area reflecting tumor lesions, and it is required to highlight it as a key area. A specific area is circled with a prominent color (e.g., red or green) different from the colors in the ultrasonic imaging graph, such that when the multimedia image data is played, the key area is highlighted. Those skilled in the art would appreciate that the information item regarding at least one of the displaying location and displaying format may be manually added or automatically added. For example, an ultrasonic image analysis algorithm in the medical field may be used to automatically circle a suspicious key area, and its location information is automatically added to the annotation text.

Some information items included in the annotation text have been introduced above. Those skilled in the art would appreciate that the above information items are only exemplary, not intended to limit. The annotation text may comprise some other information items, e.g., the generation time of multimedia data, the name of the multimedia data object (e.g., patient name), etc.

Although three annotation texts are illustrated above with reference to FIG. 2, those skilled in the art would appreciate that the above three annotation texts may be combined into a single annotation text, or the three partitions may be further divided to generate more sub-partitions and corresponding one or more annotation texts.

After the annotation texts associated with multimedia data are formed, search may be performed using the annotation text, and a corresponding partition of the multimedia data may be displayed based on the search result.

A user may search based on at least one of keyword, content description, importance level, classification information, main color, role attribute, hot degree graph, key area, security level, and geographical location. For example, in the scenario as shown in FIG. 2, the rear-end technical supervisor may perform search based on the keyword (failure), importance (2 or above), and security level (2 or above) to find annotations 212 and 213, and based on the search result, corresponding multimedia data partitions 202 and 203 are displayed based on the search result. Those skilled in the art would appreciate that in different scenarios, search may be performed based on one or more different items to enhance efficiency. For example, as mentioned above, an image with a main color being blue is searched. For another example, search is performed using a keyword "suspected tumor lesion," and an importance being 2 or above.

As mentioned above, as far as some business application scenarios are concerned, the security hierarchy is particularly important. Therefore, security level should be designed as a top priority item to consider or a default item to consider. For example, when the user's security level is 2, although a condition item of the security level is not set upon input, the system only searches an annotation text satisfying a security level (e.g., security level being 1 or 2) in annotation texts when performing search, and presents corresponding multimedia data to the user. In another scenario, the security level may be designed as a final item to consider or the default item to consider. For example, when the user's security level is 2, although the condition item of security level is not set upon input, the system, when performing search, only searches the annotation text (e.g., security level being 1 or 2) satisfying a security level in the annotation text, and the corresponding multimedia data is presented to the user.

Figure 3:
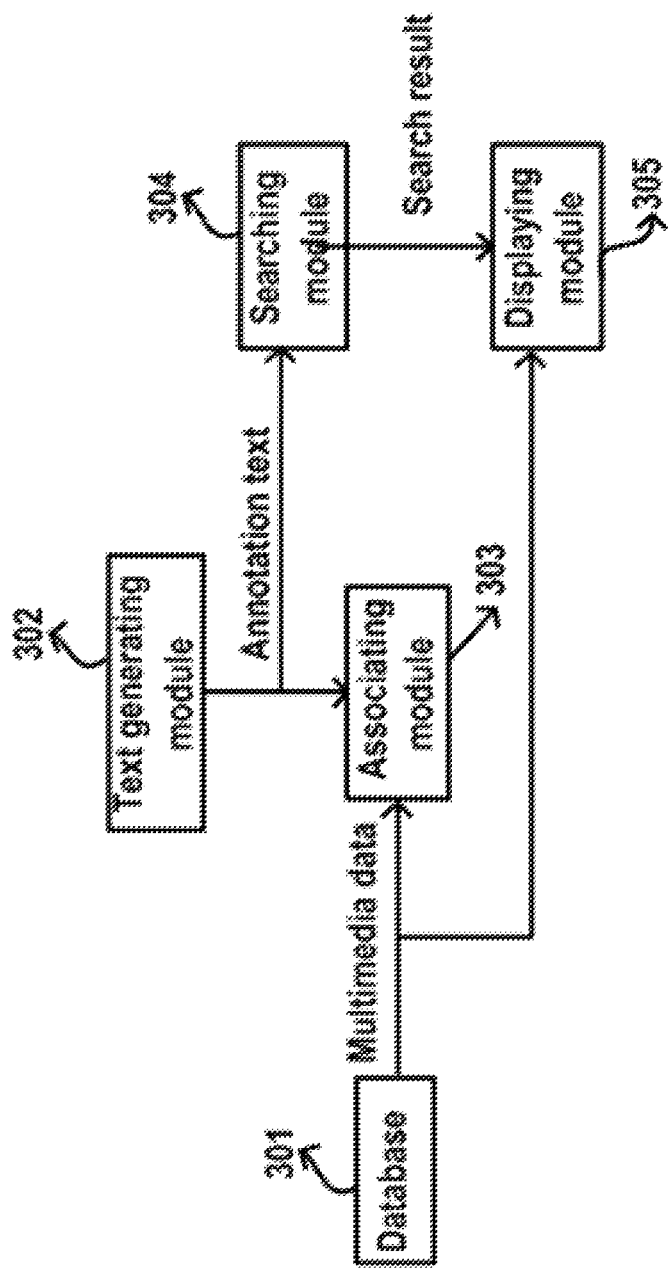
FIG. 3 shows a block diagram of a system for processing multimedia data according to one embodiment of the present disclosure.

Hereinafter, refer to FIG. 3, in which a block diagram of a system for processing multimedia data according to one embodiment of the present disclosure is presented. As mentioned above, the multimedia processing system comprises a multimedia database 301, an annotation text generating module 302, an associating module 303, a searching module 304, and a displaying module 305. The associating module 303 associates an annotation text generated by the text generating module 302 and a multimedia or multimedia partition in the multimedia database 301, wherein respective information items as mentioned above may be automatically (for example, using an optical character recognition device and a voice recognition device) or manually added in the annotation text, e.g., the annotation text may comprise information indicating start time and stop time of a corresponding partition, and may also comprise information indicating at least one of the keyword, content description, importance level, classification information, main color, role attribute, hot degree graph, key area, security level and geographical location of the multimedia data. Besides, the annotation text may also comprise information indicating at least one of a display location and a display format upon play.

After respective information items are successfully added, the searching module 304 may be used to search an annotation text, e.g., searching based on the information indicating at least one of the keyword, content description, importance level, classification information, main color, role attribute, hot degree graph, key area, security level and geographical location of the multimedia data. As mentioned above, the searching module may be configured to only search an annotation text satisfying a security level among the annotation texts.

Besides, the displaying module 305 extracts a corresponding multimedia data partition from the multimedia database 301 based on a search result of the searching module 304 so as to display it. Those skilled in the art would appreciate that the displaying module 305 may randomly combine a plurality of multimedia data partitions, and may display some information items in the annotation information while playing the multimedia data. For example, a displaying module such as a dynamic displaying engine may be used to on-line display a search result, and the displaying engine may on-line generate a combined multimedia partition and load some information in the annotation text to the multimedia data. As mentioned above, the displaying module 305 may be configured to only display a partition satisfying a security level in the multimedia data.

According to another embodiment of the present disclosure, there is provided a computer program product stored on a non-transient computer-readable memory medium for processing multimedia data, comprising: a first program instruction for generating an annotation text, and a second program instruction for associating the annotation text with a corresponding partition in the multimedia data. Those skilled in the art would appreciate that the above method steps and apparatus products may be implemented in a form of computer software or program code. In this embodiment, the multimedia data partition and its associated annotation text may be separately stored into XML or no-sql storage (e.g., JSON format). As is well-known in the art, the XML or no-sql storage allows full-text search and data screening.

Although the present disclosure has been described with reference to several preferred embodiments, it should be understood that the present disclosure is not limited to the preferred embodiments of the present disclosure. The present disclosure intends to cover various amendments and equivalent arrangements included within the spirit and scope of the appended claims. The scope of the appended claims meets the broadest explanations, thereby covering all such amendments and equivalent structures and functions.

The invention claimed is:

1. A method for processing multimedia data into annotated multimedia partitions using a multimedia processing system including one or more processors and memory, the method comprising:
   obtaining a first multimedia partition of a first multimedia data stream;
   obtaining a second multimedia partition of a second multimedia data stream, the second multimedia partition being different from the first multimedia partition;
   generating a first annotation and a second annotation, the second annotation being different from the first annotation;
   associating the first annotation with the first multimedia partition of the first multimedia data stream;
   associating the second annotation with the second multimedia partition of the second multimedia data stream;
   combining the first multimedia data stream and the second multimedia data stream to form a combined multimedia data stream that includes the first multimedia partition associated with the first annotation and the second multimedia partition associated with the second annotation, the first annotation including first annotation text, and the second annotation including second annotation text; and
   performing a full-text search of at least the different first and second annotation texts associated with the different first and second multimedia partitions, respectively, for corresponding multimedia data, using the combined multimedia data stream.

2. The method according to claim 1, wherein the first and second annotation includes information indicating start time and stop time of a corresponding partition.

3. The method according to claim 1, wherein the first and second annotation comprises information indicating at least one of keyword, content description, importance level, classification information, main color, role attribute, hot degree graph, key area, security level and geographical location of the multimedia data.

4. The method according to claim 1, wherein the multimedia data is one of video data, audio data, image data, and text data.

5. The method according to claim 4, wherein when the multimedia data is video data or image data, an optical character recognition technology is used to recognize characters in a video frame or an image, and the first and second annotation is generated based on the recognized characters.

6. The method according to claim 4, wherein when the multimedia data is audio data, a voice recognition technology is used to recognize words in an audio, and the first and second annotation is generated based on the recognized words.

7. The method according to claim 1, wherein the first and second annotation comprises information indicating at least one of a displaying location during play and a displaying format.

8. The method according to claim 1, further comprising:
   having performed the full-text search of at least the first and second annotation texts, displaying a corresponding partition of the multimedia data based on a search result.

9. The method according to claim 8, wherein performing the full-text search of at least the first annotation text and the second annotation text using the combined multimedia data stream comprises:
   performing the full-text search further using at least one of a keyword, a content description, an importance level, classification information, a main color, a role attribute, a hot degree graph, a key area, a security level, and a geographical location of the multimedia data.

10. The method according to claim 8, wherein performing the full-text search of at least the first annotation text and the second annotation text using the combined multimedia data stream is performed only if the first annotation or the second annotation respectively satisfies a threshold security level.

11. The method according to claim 8, wherein displaying a corresponding partition of the multimedia data based on the search result is only displaying a corresponding partition satisfying a threshold security level in the first or second annotation.

12. The method of claim 1 wherein the obtaining of the first multimedia partition includes obtaining the first multimedia partition that corresponds to a first continuously shot video partition, and wherein the obtaining of the second multimedia partition includes obtaining the second multimedia partition that corresponds to a second continuously shot video partition.

13. The method of claim 12 wherein the combining of the first multimedia data stream and the second multimedia data stream to form the combined multimedia data stream includes forming the combined multimedia data stream that includes the first continuously shot video partition associated with the first annotation and the second continuously shot video partition associated with the second annotation, the first continuously shot video partition and the second continuously shot video partition being discontinuous in time.

14. The method of claim 1 further comprising:
obtaining a respective multimedia partition among the first multimedia partition and the second multimedia partition; and
obtaining a respective annotation among the first annotation and the second annotation, the respective annotation corresponding to the respective multimedia partition, the respective annotation including at least displayable information and a displaying location within the respective multimedia partition where the displayable information is to be displayed during play of the respective multimedia partition.

15. The method of claim 14 further comprising:
playing the respective multimedia partition, the playing of the respective multimedia partition including displaying the displayable information included in the respective annotation at the displaying location within the respective multimedia partition.

16. The method of claim 1 further comprising:
obtaining a respective multimedia partition among the first multimedia partition and the second multimedia partition, the respective multimedia partition including non-stream image data.

17. A system for processing multimedia data into annotated multimedia partitions, comprising:
a database containing multimedia data communicatively coupled to a processor configured to store computer executable code, the computer executable code configured to perform the following steps:
obtaining a first multimedia partition of a first multimedia data stream;
obtaining a second multimedia partition of a second multimedia data stream, the second multimedia partition being different from the first multimedia partition;
generating a first annotation and a second annotation, the second annotation being different from the first annotation;
associating the first annotation with the first multimedia partition of the first multimedia data stream;
associating the second annotation with the second multimedia partition of the second multimedia data stream;
combining the first multimedia data stream and the second multimedia data stream to form a combined multimedia data stream that includes the first multimedia partition associated with the first annotation and the second multimedia partition associated with the second annotation, the first annotation including first annotation text, and the second annotation including second annotation text; and; and
performing a full-text search of at least the different first and second annotation texts associated with the different first and second multimedia partitions, respectively, for corresponding multimedia data, using the combined multimedia data stream.

18. The system according to claim 17, wherein the first and second annotation includes information indicating start time and stop time of a corresponding partition.

19. The system according to claim 17, wherein the first and second annotation comprises information indicating at least one of keyword, content description, importance level, classification information, main color, role attribute, hot degree graph, key area, security level and geographical location of the multimedia data.

20. The system according to claim 17, wherein the first and second annotation comprises information indicating at least one of a displaying location during play and a displaying format.

21. The system according to claim 17, wherein the computer executable code is further configured to perform the steps of:
having performed the full-text search of at least the first and second annotation texts, displaying a corresponding partition of the multimedia data based on a search result.

22. The system according to claim 21, wherein performing the full-text search of at least the first annotation text and the second annotation text using the combined multimedia data stream comprises performing the full-text search further using at least one of a keyword, a content description, an importance level, classification information, a main color, a role attribute, a hot degree graph, a key area, a security level, and a geographical location of the multimedia data.

23. The system according to claim 21, wherein performing the full-text search of at least the first annotation text and the second annotation text using the combined multimedia data stream is performed only if the first annotation or the second annotation respectively satisfies a threshold security level.

24. The system according to claim 21, wherein displaying the corresponding partition of the multimedia data is performed only if the corresponding partition of multimedia data satisfies a security threshold contained within the first or second annotation level in the multimedia data.

25. A computer program product stored on a non-transient computer-readable memory medium for processing multimedia data, using a multimedia processing system including one or more processors and memory, so that the multimedia data becomes searchable, comprising:
a first program instruction for obtaining a first multimedia partition of a first multimedia data stream;
a second program instruction for obtaining a second multimedia partition of a second multimedia data stream, the second multimedia partition being different from the first multimedia partition;
a third program instruction for generating a first annotation and a second annotation, the second annotation being different from the first annotation;
a fourth program instruction for associating the first annotation with the first multimedia partition of the first multimedia data stream;

a fifth program instruction for associating the second annotation with the second multimedia partition of the second multimedia data stream;
a sixth program instruction for combining the first multimedia data stream and the second multimedia data stream to form a combined multimedia data stream that includes the first multimedia partition associated with the first annotation and the second multimedia partition associated with the second annotation, the first annotation including first annotation text, and the second annotation including second annotation text; and
a seventh program instruction performing a full-text search of at least the different first and second annotation texts associated with the different first and second multimedia partitions, respectively, for corresponding multimedia data, using the combined multimedia data stream.

* * * * *